US012705186B2

(12) United States Patent
Kapoor et al.

(10) Patent No.: US 12,705,186 B2
(45) Date of Patent: Aug. 11, 2026

(54) TECHNIQUES AND DEVICES FOR CONFIGURABLE MEMORY ENCRYPTION AND AUTHENTICATION

(71) Applicant: Cryptography Research, Inc., San Jose, CA (US)

(72) Inventors: Ajay Kapoor, Eindhoven (NL); Marcel Van Loon, Oss (NL)

(73) Assignee: Cryptography Research, Inc., San Jose, CA (US)

( * ) Notice: Subject to any disclaimer, the term of this patent is extended or adjusted under 35 U.S.C. 154(b) by 45 days.

(21) Appl. No.: 18/839,408

(22) PCT Filed: Feb. 24, 2023

(86) PCT No.: PCT/US2023/013874
§ 371 (c)(1),
(2) Date: Aug. 16, 2024

(87) PCT Pub. No.: WO2023/164167
PCT Pub. Date: Aug. 31, 2023

(65) Prior Publication Data
US 2025/0165408 A1 May 22, 2025

Related U.S. Application Data

(60) Provisional application No. 63/325,720, filed on Mar. 31, 2022, provisional application No. 63/314,223, filed on Feb. 25, 2022.

(51) Int. Cl.
*G06F 12/14* (2006.01)
*G06F 11/10* (2006.01)
*H04L 9/06* (2006.01)

(52) U.S. Cl.
CPC ...... *G06F 12/1408* (2013.01); *G06F 11/1004* (2013.01); *H04L 9/0631* (2013.01); *G06F 2212/1052* (2013.01)

(58) Field of Classification Search
CPC ............ G06F 11/1004; G06F 12/1408; G06F 2212/1052; H04L 9/0631
See application file for complete search history.

(56) References Cited

U.S. PATENT DOCUMENTS 9,092,644 B2 7/2015 Narendra Trivedi et al.
9,959,418 B2 5/2018 Bhattacharyya et al.
(Continued)

FOREIGN PATENT DOCUMENTS

JP 2016075765 A 5/2016

OTHER PUBLICATIONS

Gueron, Shay, "A Memory Encryption Engine Suitable for General Purpose Processors", IACR Cryptol. ePrint Arch. 2016 (2016):204. 14 pages.
(Continued)

*Primary Examiner* — Viet D Vu
(74) *Attorney, Agent, or Firm* — Lowenstein Sandler LLP

(57) ABSTRACT

Disclosed systems and techniques involve flexible encryption, decryption, retrieval, and authentication of data. The systems may include a cryptographic processor that, in a first selectable mode of operation is configured to identify plaintext blocks, generate encrypted ciphertext blocks, process sequentially the ciphertext blocks to obtain an authentication value, encrypt the authentication value, and store the ciphertext blocks and an authentication tag, obtained based on the encrypted authentication value. In a second selectable mode, the cryptographic processor may perform ciphertext block encryption but forgo obtaining the authentication value.

20 Claims, 8 Drawing Sheets

(56) References Cited

U.S. PATENT DOCUMENTS

| | | | | |
|---|---|---|---|---|
| 10,298,555 | B2 * | 5/2019 | Murray | H04L 63/061 |
| 10,489,612 | B2 | 11/2019 | Frank et al. | |
| 10,528,485 | B2 | 1/2020 | Chhabra et al. | |
| 10,594,491 | B2 | 3/2020 | Durham et al. | |
| 10,872,043 | B2 | 12/2020 | Le Goffic et al. | |
| 11,108,552 | B1 * | 8/2021 | Gueron | H04L 9/0869 |
| 2001/0046292 | A1 * | 11/2001 | Gligor | H04L 9/3247 380/37 |
| 2007/0106896 | A1 | 5/2007 | Sandberg et al. | |
| 2009/0185677 | A1 * | 7/2009 | Bugbee | H04L 9/0841 380/28 |
| 2011/0040967 | A1 * | 2/2011 | Waller | G06F 21/10 713/160 |
| 2012/0087490 | A1 * | 4/2012 | Ollikainen | H04L 9/0637 380/28 |
| 2018/0181499 | A1 * | 6/2018 | Branco | H04L 9/0662 |
| 2018/0294968 | A1 | 10/2018 | Johnson et al. | |
| 2019/0007390 | A1 | 1/2019 | Wu et al. | |
| 2020/0125501 | A1 | 4/2020 | Durham et al. | |
| 2022/0311598 | A1 * | 9/2022 | Yankilevich | H04L 9/0637 |

OTHER PUBLICATIONS

Notification of Transmittal of the International Search Report and the Written Opinion of the International Searching Authority, or the Declaration with Mail Date Aug. 25, 2023 re: Int'l Appln. No. PCT/US23/13874. 15 pages.

Wong, Ming Ming et al., "SMARTS: Secure Memory Assurance of RISC-V Trusted SoC", In Proceedings of the 7th International Workshop on Hardware and Architectural Support for Security and Privacy (HASP '18). Association for Computing Machinery, New York, NY, USA, 2018, Article 6, 1-8. DOI:hhttps://doi.org/10.1145/3214292.3214298. 9 pages.

EP Extended European Search Report with Mail Date Jan. 28, 2026 re: EP Appln. No. 23760713.0. 8 pages.

Zhang, Ping et al., "INT-RUP Security of Checksum-Based Authenticated Encryption", 18th International Conference, Oct. 2017, XP047451074, ISBN: 978-3-540-74549-5, https://doi.org/10.1007/978-3-319-68637-0_9. 20 pages.

* cited by examiner

TECHNIQUES AND DEVICES FOR CONFIGURABLE MEMORY ENCRYPTION AND AUTHENTICATION

RELATED APPLICATIONS

This is a national stage application under 35 U.S.C. 371 of International Application PCT/US23/13874, filed Feb. 24, 2023, which claims benefit to U.S. Provisional Patent Application No. 63/325,720, filed Mar. 31, 2022, and U.S. Provisional Patent Application No. 63/314,223, filed Feb. 25, 2022, the contents of all aforementioned applications being incorporated by reference in their entirety herein.

TECHNICAL FIELD

The disclosure pertains to cryptographic computing applications, more specifically to cryptographic engines and techniques that allow efficient configurable encryption, authentication, retrieval, and decryption of data in applications where a variety of different levels of cryptographic protection may be used for different types of data and memory devices that are used to store the data.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
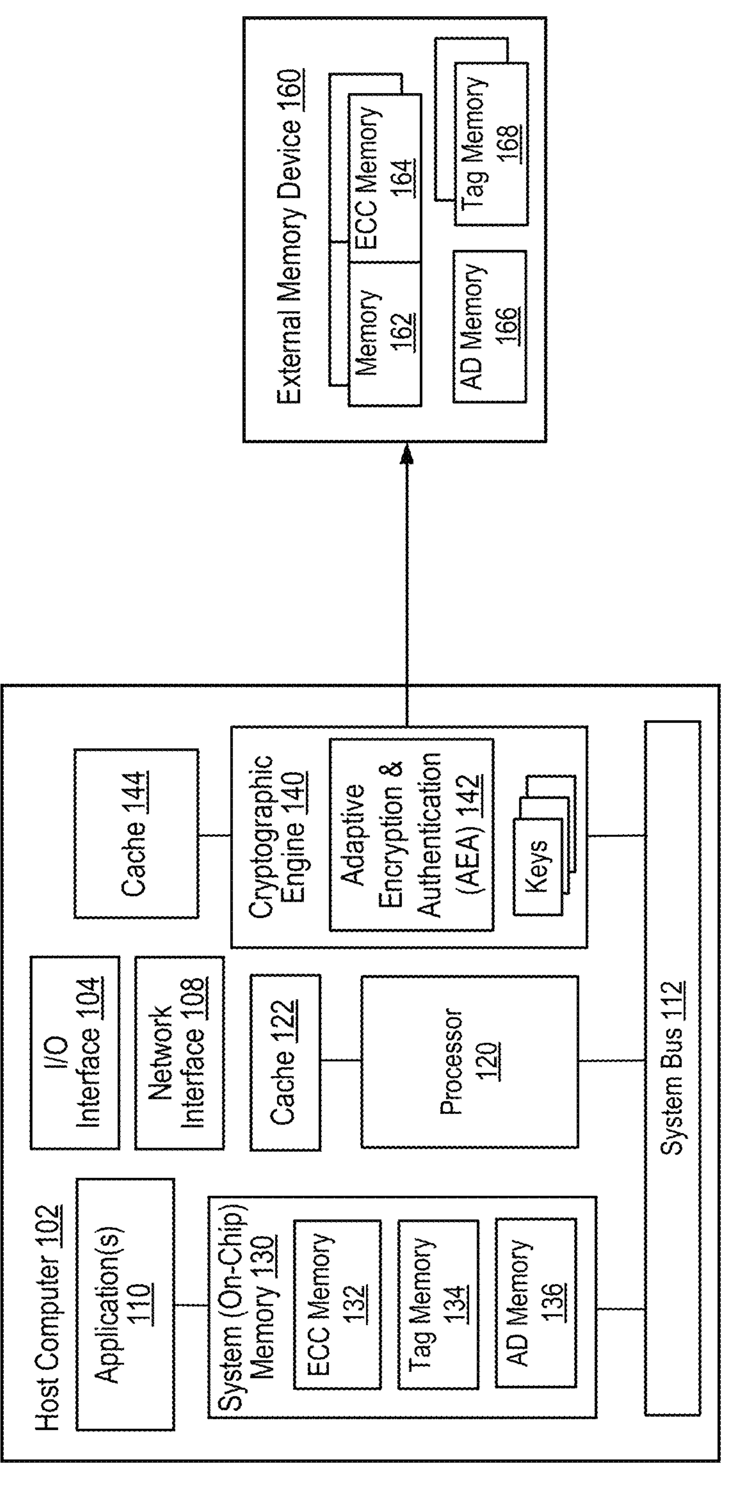
FIG. 1 is a block diagram illustrating an example system architecture in which implementations of the present disclosure may operate.

Aspects of the present disclosure are directed to efficient and versatile data encryption, decryption, and authentication operations which allow to achieve a target level of protection and to meet a desired standard of data security by multiple applications that may be operating on a particular computing platform. The target level of protection offered by the disclosed architecture and techniques may include spoofing attacks, splicing attacks, replay attacks, and the like, or any combination thereof. More specifically, the disclosed cryptographic engine architecture that includes one or more ciphers that performs block-wise encryption of a parcel of data, which may include multiple blocks, together with an optional authentication of the encrypted parcel. The authentication may be performed based on a unique (for a given parcel) authentication data (AD), whose content may depend on the type of a potential attack against which the parcel of data needs to be protected. The authentication data may be processed together with the encrypted blocks and the final authentication tag (or, often, tag herein) may be additionally encrypted with the cipher. During decryption, a new (control) tag computed using the decrypted blocks may be compared with the stored tag and a tag mismatch is treated as a suspected tampering with the data. For example, in a spoofing attack, an attacker removes a portion of the data and/or replaces the data with some other data. To protect against spoofing attacks, a basic authentication may be performed, e.g., computed using the AD having all zeros (or any other fixed value). In a splicing attack, data stored at a particular address A is replaced with data stored at address B. To protect against splicing attacks, the AD may include an address where the data is stored, so that a tag mismatch may indicate data substitution. In a replay attack, the data at a given address is replaced with an older version of the data at the same address. To protect against replay attacks, the AD may include a version number of the data, so that a tag mismatch may indicate substitution of the data with an older version of the same data.

In some instances, a tag mismatch can have a benign cause that is unrelated to any attacks, e.g., data corruption during writing, storage, or retrieval. To correct for such a possibility, an error correction code (ECC) is typically stored together with the data. The ECC can include a number of bits that allow detecting and repairing single-bit (or multi-bit, in the instances of more elaborate ECCs) errors in the data. During a read operation, both the ECC code and the tag are retrieved alongside the data. The ECC code is then used to check for (and repair, if necessary) the errors in the data. Subsequently, the control tag is generated and compared with the retrieved tag to perform authentication of the data. This conventional processing, which includes routine retrieval of ECCs and tags, results in a substantial overuse of the memory access bandwidth as data corruption is, typically, an infrequent occurrence in modern high-quality memory devices. As a result, ECC retrieval in most instances is an unnecessary operation.

In some implementations of the disclosure, improvement in the memory bandwidth utilization is achieved by swapping storage of tags with the storage of ECCs. Consequently, the tags may be stored in place of the ECC, e.g., together with the encrypted data. The tags may be retrieved with the data and processed together. The ECC for the data need not be initially retrieved. In those instances where tag mismatch is detected, the mismatch can be caused by a security breach (a malicious attack) or a benign data corruption. Upon a mismatch detection, a processing device that performs decryption/authentication of the data may retrieve the ECC and attempt to repair the data. In those instances where the ECC repair is successful, the initial tag mismatch may be attributed to data corruption. In the instances where the ECC repair is unsuccessful, the persisting tag mismatch may be attributed to a security breach.

The disclosed implementations may be used in conjunction with any applicable block ciphers. Block ciphers operate by processing an input plaintext block of data (e.g., a 128-bit block, 256-bit block, etc.) together with a cryptographic key through a series of computations that produce an encrypted block (ciphertext). Typical block ciphers may include 128-bit, 192-bit, or 256-bit key Advanced Encryption Standard (AES) algorithms, AES-GCM (Galois Counter Mode) algorithms, AES-XTS algorithms, SM4 algorithms, and the like. The disclosed implementations may further involve encryption of links between various interconnected devices, such as processors, accelerators, memory stores, etc., in a cache-coherent manner. An exchange of data (e.g., memory reads and writes) between such devices can be protected with cryptographic keys that may be different for various devices and for various links between the same devices. For example, data exchanges between a central processing unit (CPU) and a graphics processing unit (GPU) may be protected with one key while data exchanges between the CPU and a memory storage may be protected with another key, and so on.

Numerous implementations and modifications of these and other encryption and authentication techniques are described below. The advantages of the disclosed implementations include but are not limited to encryption, decryption, and authentication techniques that enable flexible security with different levels of protection accorded to different data, memory partitions, applications and the like. The disclosed techniques allow to selectively provide encryption-only mode, authentication-only mode, encryption/authentication mode(s), and the like. Additionally, the disclosed implementations include scalable design solutions, which are customizable both at design time and at run time to enable protection of different memory devices or parts of the same device against various types of attacks. The disclosed techniques further enable minimizing the amount of storage needed to store authentication tags and optimizing bandwidth utilization during memory accesses and retrieval of authentication tags and error correction codes.

The disclosed systems and techniques offer a number of advantages compared with the existing cryptographic technology. For example, AES-XTS systems enable encryption but do not provide mechanisms for authentication. AES-GCM systems allow both encryption and authentication, but require a substantial overhead related to maintaining initialization vectors (IV). In AES-GCM systems, IVs have to be stored and then used during subsequent decryption operations. Additionally, AES-GCM systems require management of IVs to eliminate possible IV collisions during the lifetime of the cryptographic key; failure to do so can result in leakage of secret data. In contrast, the disclosed systems and techniques enable encryption/decryption with or without authentication and do not rely on IVs and/or counters to avoid IV collisions and thus do not require storing IVs (or other nonce data). The disclosed systems further include configurable hardware architecture that allows a chip designer or an ultimate user to optimize the overall design costs in view of specific security needs, such as protecting different portions of memory to a different degree, tailoring protection to the needs of different applications, and so on.

FIG. 1 is a block diagram illustrating an example system architecture 100 in which implementations of the present disclosure may operate. The example system architecture 100 may include a desktop computer, a tablet, a smartphone, a server (local or remote), a thin/lean client, and the like. The example system architecture 100 may include a host computer 102, which may be any computing device, a server, a cloud computing node, a card reader, a wireless sensor node, an Internet-of-Things (IoT) node, an embedded system dedicated to one or more specific applications, and so on. One or more applications 110 may be executed on host computer 102. The system architecture 100 may include, but need not be limited to, a host computer 102 having one or more processors 120, e.g., CPUs, GPUs, field-programmable gate arrays (FPGA), application-specific integration circuits (ASICs), and the like. "Processor" herein refers to a device capable of executing instructions encoding arithmetic, logical, or I/O operations. In one illustrative example, a processor may follow Von Neumann architectural model and may include one or more arithmetic logic units (ALUs), a control unit, and may further have access to a plurality of registers, such as a cache 122.

Host computer 102 may have access to one or more system memory 130 devices. The system memory 130 may refer to any volatile or non-volatile memory and may include a read-only memory (ROM), a random-access memory (RAM), as well as (not shown) electrically erasable programmable read-only memory (EEPROM), flash memory, flip-flop memory, or any other device capable of storing data. RAM may be a dynamic random-access memory (DRAM), synchronous DRAM (SDRAM), a static memory, such as static random-access memory (SRAM), and the like. In some implementations, system memory 130 may be an on-chip memory. System memory 130 may include an ECC memory 132 to store error correction codes for the data stored in system memory 130, a tag memory 134 to store authentication tags, and an AD memory 136 to store authentication data. In some implementations, processor(s) 120 and the system memory 130 may be implemented as a single controller, e.g., as a FPGA.

The system architecture 100 may further include an input/output (I/O) interface 104 to facilitate connection of the host computer 102 to various peripheral hardware devices (not shown) such as card readers, terminals, printers, scanners, IoT devices, and the like. The system architecture 100 may further include a network interface 108 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from host computer 102. Various hardware components of the host computer 102 may be connected via a system bus 112 that may include its own logic circuits, e.g., a bus interface logic unit (not shown).

Application(s) 110 supported by host computer 102 may include machine-learning application(s), graphics application(s), computational application(s), cryptographic application(s) (such as authentication, encryption, decryption, secure storage application(s), etc.), embedded application(s), external application(s), or any other types of application(s) that may be executed by host computer 102. Application(s) 110 may be instantiated on the same host computer 102, e.g., by an operating system executed by the processor 120 and residing in the system memory 130. Alternatively, the external application(s) 110 may be instantiated by a guest operating system supported by a virtual machine monitor (hypervisor) operating on the host computer 102. In some implementations, the external application(s) may reside on a remote access client device or a remote server (not shown), with the host computer 102 providing cryptographic support for the client device and/or the remote server.

The processor 120 may include one or more processor cores having access to a single or multi-level cache and one or more hardware registers. In implementations, each processor core may execute instructions to run a number of hardware threads, also known as logical processors. Various logical processors (or processor cores) may be assigned to one or more application(s) 110, although more than one processor core (or a logical processor) may be assigned to a single application for parallel processing. A multi-core processor 120 may simultaneously execute multiple instructions. A single-core processor 120 may typically execute one instruction at a time (or process a single pipeline of instructions). The processor 120 may be implemented as a single integrated circuit, two or more integrated circuits, or may be a component of a multi-chip module.

Host computer 102 may include a cryptographic engine 140 to implement configurable encryption, decryption, and authentication, as described in more detail below. Cryptographic engine 140 may include processing and memory components that are different from processor 120 and system memory 130. For example, cryptographic engine 140 may have access to high-speed cache 144. In some implementations, cryptographic engine 140 and system memory 130 may be implemented as a monolithic chip, with memory 130 being a dynamic random-access memory. In some implementations, processor 120 may be implemented on the same chip. Cryptographic engine 140 may perform authentication of applications, users, access requests, in association with operations of application(s) 110 or any other applications operating on or in conjunction with the host computer 102. Cryptographic engine 140 may include adaptive encryption and authentication (AEA) module 142, which is to be understood to perform both decryption of data as well. During encryption operations, AEA module 142 may receive data from processor 120 or system memory 130 (e.g., via system bus 112), identify a destination device for the received data, select a specific key used by the destination device, generate a ciphertext using the selected key and provide the generated ciphertext to the destination device, e.g., external memory device 160.

External memory device 160 may provide various functionalities to host computer 102 as described in the present disclosure. For example, external memory device 160 may include memory 162 for storing and reading data by processor 120 of host computer 102. External memory device 160 may additionally include an AD memory 166 to store authentication data, an ECC memory 164 to store error correction codes for the data stored in memory 162, a tag memory 168 to store authentication tags, and so on.

In one illustrative example, host computer 102 may execute concurrently a computational simulation application and a financial application, e.g., as two independent applications 110. The simulation application may use basic authentication whereas the financial application may require more advanced authentication protection against splicing attacks and replay attacks. Accordingly, AEA module 142 may direct a first batch of data generated by the simulation application to external memory device 160 for storage in memory 162 with the corresponding ECCs stored in ECC memory 164 and the tags stored in tag memory 168. Since the authentication may be basic, no AD needs to be stored for a subsequent tag recovery upon data retrieval. AEA module 142 may further direct a second batch of data generated by the financial application to (e.g., on-chip) system memory 130. AEA module 142 may store ECC for the second batch in ECC memory 132 and tags for the second batch in tag memory 134. To protect against splicing attacks, AD data stored in AD memory 136 may include address(es) of memory 130 at which the second batch of data is stored. To protect against replay attacks, the stored AD data may further include a version number of the data in the second batch.

Figure 2A:
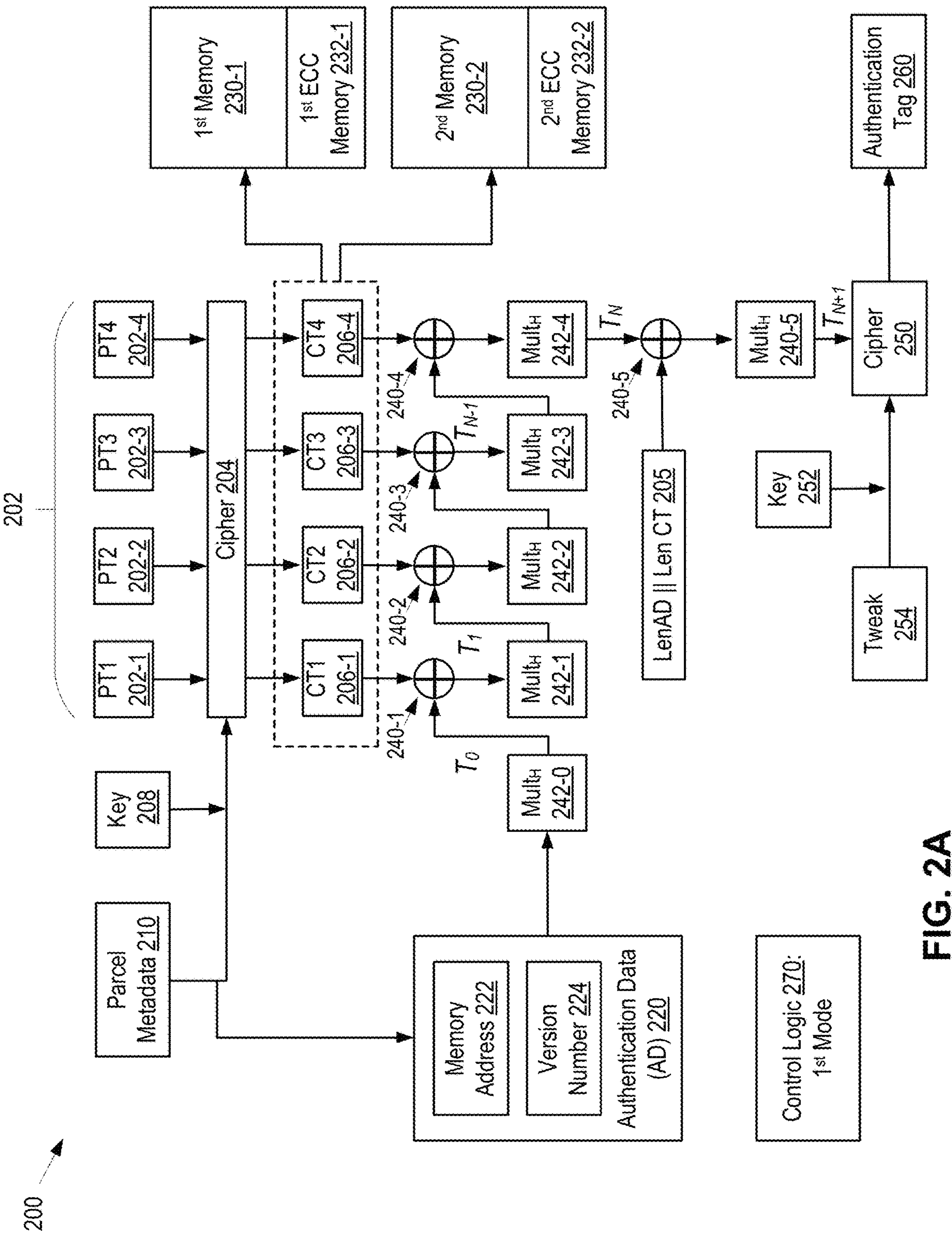
FIG. 2A is a block diagram illustrating an example architecture of a configurable cryptographic engine capable of providing flexible encryption, decryption, and authentication of data, in accordance with some implementations of the present disclosure.

FIG. 2A is a block diagram illustrating an example architecture of a configurable cryptographic engine (processor) 200 capable of providing flexible encryption, decryption, and authentication of data, in accordance with some implementations of the present disclosure. For concreteness, FIG. 2A illustrates performance of encryption operations of cryptographic engine 200, but it should be understood that decryption operations may be performed similarly. Cryptographic engine 200 may be cryptographic engine 140 of host computer 102 of FIG. 1. Operations of cryptographic engine 200 may be controlled by AEA module 142. Cryptographic engine 200 may have access to multiple cryptographic keys associated with different applications (e.g., applications 110 of FIG. 1). Keys may include session keys that are generated (e.g., using a master key) for a particular application session or a time epoch, and so on.

As depicted in FIG. 2A, cryptographic engine 200 may encrypt a parcel of data 202, which may include multiple plaintext blocks PT1 202-1 . . . PT-4 202-4. Each plaintext block 202-*n* may include any number of bits, e.g., 128 bits, 256 bits, 512 bits, etc. For example, parcel of data 202 may have 512 bits of data segmented into four 128-bit plaintext blocks 202-*n*, but any other number of blocks may be used instead. Cryptographic engine 200 may encrypt each of the plaintext blocks 202-*n* using any suitable cipher circuit 204, e.g., AES cipher, SM4 cipher, and the like, and produce a corresponding number of ciphertext blocks 206-*n*. The encryption process may be based on a key 208, which may be any suitable cryptographic key, e.g., a symmetric key. Additionally, cipher circuit 204 may use any parcel metadata 210 associated with a specific parcel being encrypted, e.g., as a modifier of the encryption process. Parcel metadata 212 may also be used as authentication data (AD) 220 that may include memory address 222, version number 224, initialization value (IV), and the like. Memory address 222 may be a location in a memory device where ciphertext blocks 206-*n* may be stored upon encryption, e.g., a location in system memory 130, or in some external memory, e.g., memory 162 of external memory device 160. Version number 205 may be any identifier capable of identifying temporal evolution of the data to which parcel of data 202 belongs.

Memory address 222 and/or version number 224 may be used in the encryption process in any suitable way. For example, memory address 222 and/or version number 224 may be added, e.g., using XOR (modulo 2) addition, to each plaintext block 201-*n* prior to application of cipher circuit 204. In some implementations, memory address 222 and/or version number 224 may be added after each plaintext block 201-*n* is processed by cipher circuit 204. In some implementations, memory address 222 and/or version number 224 may first be encrypted (using key 208) by cipher circuit 204 and the result added to plaintext blocks 202-*n* to obtain ciphertext blocks 206-*n*. Any combination of the above may also be used, e.g., memory address 222 and/or version number 224 may be added to plaintext blocks 202-*n* and to ciphertext blocks 206-*n*.

In some implementations, cipher circuit 204 encrypts each plaintext block 202-*n* independently and, e.g., in parallel. In some implementations, cipher circuit 204 encrypts each subsequent plaintext block 202-*n* by chaining its processing to the output of encryption of the preceding block

202-*n*−1. For example, cipher circuit 204 may encrypt the first plaintext block 202-1 using memory address 222 and/or version number 224; subsequently, cipher circuit 204 may encrypt the second plaintext block 202-2 using the first encrypted ciphertext block 206-1. For example, the first encrypted ciphertext block 206-1 may be added to memory address 222 and/or version number 224 and then input into cipher circuit 204 before processing the second plaintext block 202-2. Alternatively, the first encrypted ciphertext block 206-1 may be used instead of memory address 222 and/or version number 224 when cipher circuit 204 processes the second plaintext block 202-2.

The encrypted parcel of data, including ciphertext blocks 206-*n* may be stored in one or more memory devices, e.g., first memory 230-1 and/or second memory 230-2, any of which may be an on-chip memory or an off-chip memory. Additionally, an ECC engine (not shown in FIG. 2A), may compute error correction codes (bits) for various ciphertext blocks 206-*n* and store the computed codes in ECC memory 232-*n*, which may be a portion of memory 230-*n* or a separate memory device, in association with corresponding ciphertext blocks 206-*n*. For example, for each 512-bit parcel of encrypted data stored in memory 230-*n*, a 64-bit ECC may be stored in ECC memory 232-*n*.

In addition to computing ciphertext blocks 206-*n*, cryptographic engine 200 may generate an authentication tag. In some implementations, the tag may be generated in view of AD 220. More specifically, cryptographic engine 200 may include a number of addition circuits 240-*n* (e.g., XOR circuits) and multiplication circuits 242-*n*. Each multiplication circuit 242-*n* may multiply an input value by a precomputed auxiliary value H (hash key), which may be a string of zeros encrypted by a cipher (e.g., a cipher circuit of the same type as cipher circuit 204), or any other suitable value. Multiplication circuits 242-*n* may be circuits that perform polynomial multiplications over Galois fields $GF(2^n)$ with n elements. For example, if ciphertext block size is 128 bits (or 256 bits, etc.) the multiplication may be over Galois field $GF(2^{121})$ (or $GF(2^{256})$, etc.). Multiplication circuit 242-0 may multiply AD 220 by the auxiliary value to compute $T_0=AD\cdot H$. The output of multiplication circuit 242-0 may be added to the first ciphertext block 206-1 by addition circuit 240-1 and the result multiplied by the auxiliary value by multiplication circuit 242-1 to compute $T_1=(T_0\oplus CT\mathbf{1})\cdot H$. Similar addition and multiplication operations may be performed for the remaining ciphertext blocks, $T_n=(T_{n-1}\oplus CTn)\cdot H$, up to the last ciphertext block, n=N (although N=4 in the example in FIG. 2A, any number of ciphertext blocks may be associated with a tag). Another addition circuit 240-5 may then add a value that represents a length of AD 220 (len AD) and/or a length of a ciphertext block (len CT), which may be concatenated together. For example, a 64-bit representation of the length of AD 220 may be concatenated with a 64-bit representation of the length of a ciphertext block: $T_N\oplus(\text{len AD}\|\text{len CT})$. A final multiplication circuit 242-5 may then compute one additional multiplication, $T_{N+1}$ $(T_N\oplus(\text{len AD}\|\text{len CT}))\cdot H$.

Numerous modifications and variations of the architecture of cryptographic engine 200 are within the scope of the instant disclosure. In particular, AD 220 may include any suitable data that is customizable at run time. AD 220 may include any additional data not specifically depicted in FIG. 2A, such as an initialization vector (IV), a counter, and the like. In some implementations, AD 220 may be customizable in view of a specific memory device, or a particular region of the memory device, that is used to store encrypted data. In some implementations, AD 220 may be customizable in view of various security requirements established for a particular application that uses data encryption. For example, for basic authentication of encrypted data, AD 220 may include a predetermined (e.g. fixed) value, such as a value having all 0s or all 1s in place of both memory address 222 and version number 224. In some implementations, where the objective is to protect data against splicing attacks but not replay attacks, memory address 222 may be present in AD 220 while version number 224 may be absent (or replaced with a fixed value, e.g., all 0s). Likewise, in the instances where the objective is to protect data against replay attacks but not splicing attacks, memory address 222 may be absent in AD 220 (or replaced with a fixed value, e.g., all 0s or all 1s or the like) while version number 224 may be included in AD 220. To protect against both splicing attacks and replay attacks, both memory address 222 and version number 224 may be included in AD 220. In some applications, encryption of data is performed but authentication is not performed. In such instances, AEA module 142 or a control logic of cryptographic engine 200 may disable the authentication function that includes addition circuits 240-*n*, multiplication circuits 242-*n*, and cipher circuit 250. Enabling or disabling the authentication function may be performed dynamically. For example, cryptographic engine 200 may provide support to application A that uses only encryption and application B that uses both encryption and authentication. In those instances where cryptographic engine 200 encrypts data output by or otherwise associated with application A, the control logic may disable the authentication function. Subsequently, when cryptographic engine 200 processes data output by or otherwise associated with application B, the control logic may enable the authentication function, as described in more detail below.

This flexibility of encryption/authentication function provided by the architecture of cryptographic engine 200 allows to reduce the amount of memory that is used to store various metadata, such as initialization vectors, counter values, as is conventionally done in AES-GCM applications. For example, most applications supported by cryptographic engine 200 may require only basic encryption. The encrypted data associated with such applications may be stored on an outside memory device. On the other hand, a smaller portion of applications that use both encryption and authentication may use on-chip memory for storing the metadata to support the authentication. However, if the on-chip memory is insufficient or larger amount of applications need authentication, the metadata may also be stored in the off-chip memory and protected (e.g., encrypted and authenticated for protection against spoofing, splicing, and replay attacks, like other data in external memory). Memory addresses of the on-chip memory or the off-chip memory, where the corresponding data is stored, may be used as part of AD 220 without any additional overhead that is typically associated with IV storage. If replay protection is needed, version number 224 may also be stored within the on-chip memory. In some implementations, version numbers may already be stored for other purposes, e.g., data management, so that authentication of the data stored in the on-chip memory does not add any further overhead.

In some implementations, cryptographic engine 200 may have a flexible architecture capable of supporting multiple modes of operations. More specifically, a mode of cryptographic engine 200 may be selectable via a control logic 270. Different modes may be tailored to specific applications and specific security needs of those applications. For example, operations of the cryptographic engine 200, depicted in FIG. 2A, may correspond to a first mode of operation that provides both encryption and authentication. The degree to which authentication protects against various types of attacks (e.g., splicing attacks, replay attacks, etc.) may be controlled by the composition of AD 220, as described above.

Figure 2B:
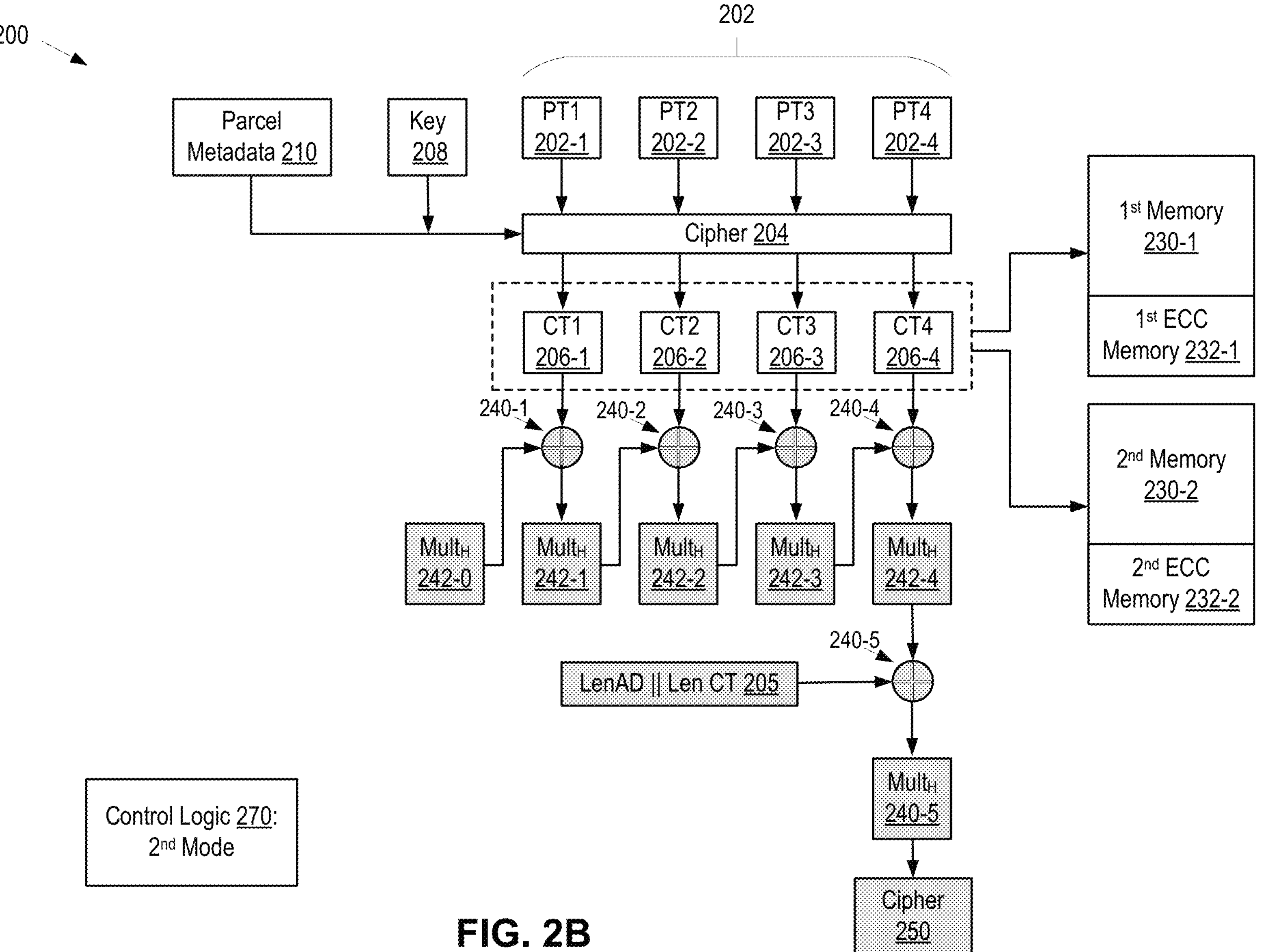
FIG. 2B is a block diagram illustrating operations of the configurable cryptographic engine of FIG. 2A in an encryption-only mode of operation, in accordance with some implementations of the present disclosure.

FIG. 2B is a block diagram illustrating operations of the configurable cryptographic engine 200 of FIG. 2A in an encryption-only (e.g., second) mode of operation, in accordance with some implementations of the present disclosure. In the second mode, control logic 270 may perform no processing related to generation of the authentication tag, which is not being output, as a result. More specifically, in the second mode, control logic 270 may cause addition circuits 240-*n* and multiplication circuits 242-*n* to perform no processing (as indicated with shading of the respective circuits in FIG. 2B). The selection of the modes of encryption/authentication may be performed based on look-up tables, access tables, which may be accessible to control logic 270, or via any other suitable mechanisms. For example, when a parcel of data associated with a specific application is received (or about to be received) by cryptographic engine 200, control logic 270 may determine the level of cryptographic protection and authentication to be accorded to the parcel of data and select the mode of operation accordingly. In some implementations, the mode of operation may be selected based on the destination of the encrypted data. For example, data stored in a first memory device (location, partition, etc.), e.g., memory 230-1, may be only encrypted but not authenticated; data stored in a second memory device, e.g., memory 230-2, may be both encrypted and authenticated with memory address AD; data stored in a third memory device may be encrypted and authenticated with both memory address AD and version number AD; data stored in a fourth memory device may be authenticated but not encrypted; and so on.

Figure 3:
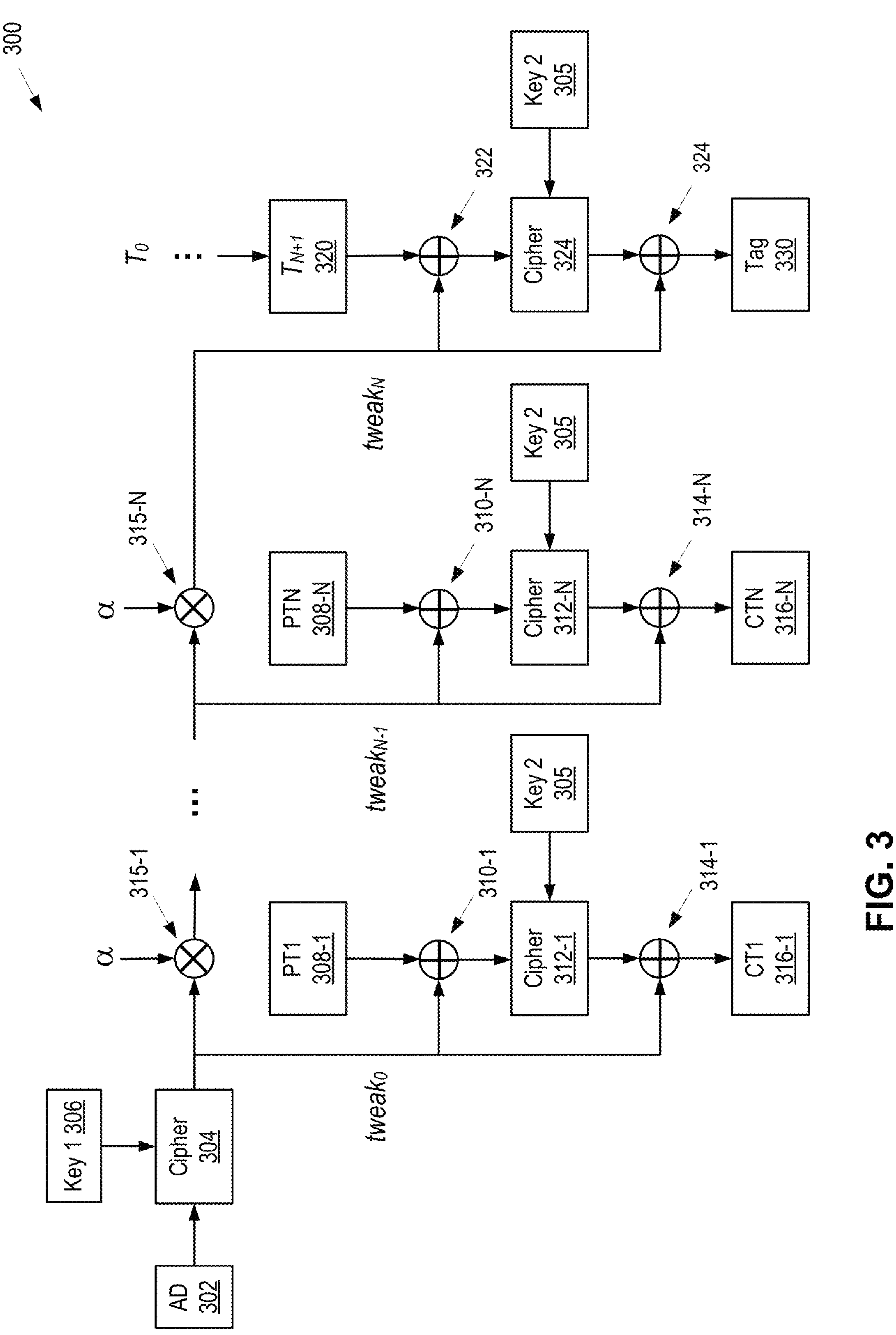
FIG. 3 is a diagram illustrating tweak reuse for double-key encryption of an authentication tag during flexible encryption, decryption, and authentication of data, in accordance with some implementations of the present disclosure.

With a continuing reference to FIG. 2A, in some implementations, an additional encrypted data called tweak 254 may be used. Tweak 254 may be encrypted with a key that is different from key 252 used by cipher circuit 250, e.g., key 208 used by cipher circuit 204 or some other key. FIG. 3 is a diagram illustrating tweak reuse for double-key encryption of an authentication tag during flexible encryption, decryption, and authentication of data, in accordance with some implementations of the present disclosure. In tweak-based encryption, an initial tweak value $tweak_0$ may be generated by cipher circuit 304 using AD 302 (or any portion of AD, as discussed above) and a first cryptographic key 306. The value $tweak_0$ may then be used to encrypt a first plaintext block 308-1 using a second cryptographic key 305 to obtain a first ciphertext block 316-1. As illustrated in FIG. 3, addition circuits 310-1 and 314-1 may be used to add value $tweak_0$ to the first plaintext block 308-1 and to the first ciphertext block 316-1. A multiplication circuit 315-1 may update the tweak value by multiplying $tweak_0$ with some auxiliary value a, which may be a primitive element of the respective Galois field, e.g., $GF(2^{128})$: $tweak_1=\alpha\cdot tweak_0$. Similar processing may be performed for each subsequent plaintext block of the data parcel. In particular, during processing of the last, N-th, plaintext block 308-N, addition circuits 310-N and 314-N may be used to add (N−1 times updated) tweak value $tweak_{N-1}$ to the last plaintext block 308-N and to the last ciphertext block 316-N. A multiplication circuit 315-1 may perform a final tweak update: $tweak_N=\alpha\cdot tweak_{N-1}$.

In parallel (or in addition) to the encryption, the cryptographic engine may perform authentication tag processing (not depicted in FIG. 3), e.g., substantially as described above in conjunction with operations of addition circuits 240-*n* and multiplication circuits 242-*n* of FIG. 2A. Addition circuit 322 may add the final tweak value $tweak_N$ to the output $T_{N+1}$ 320 of the final multiplication circuit (e.g., multiplication circuit 242-5 in FIG. 2A) and encrypted by cipher circuit 324, e.g., using the second key 305. The output of cipher circuit 324 may be added to the final tweak value to obtain authentication tag 330. The obtained ciphertext blocks 316-1 . . . 316-N and authentication tag 330 may then be used as described above in conjunction with ciphertext blocks 206-*n* and authentication tag 260 of FIG. 2A.

Figure 4:
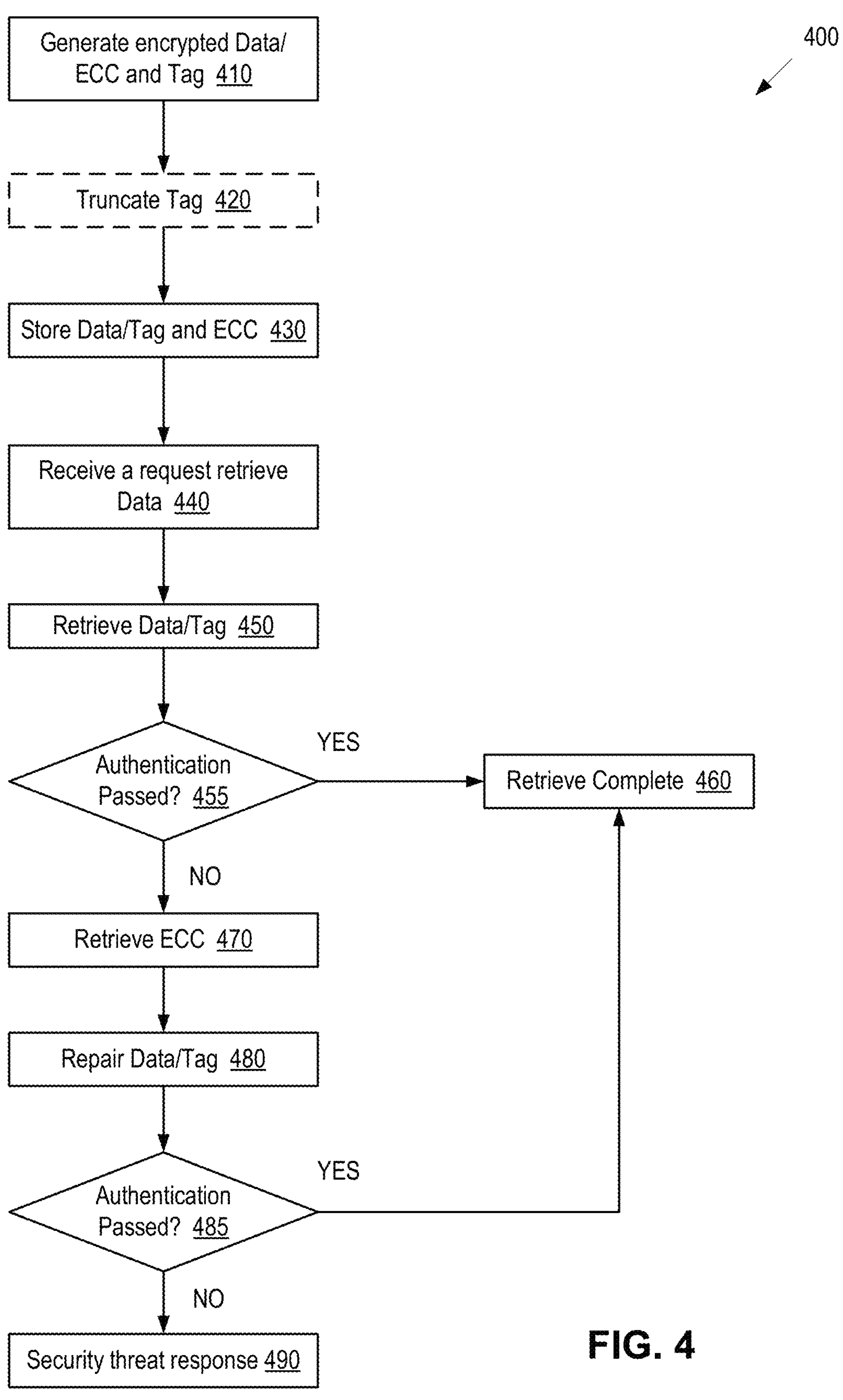
FIG. 4 is a flow diagram illustrating memory bandwidth optimization during flexible encryption, decryption, and authentication of data, in accordance with some implementations of the present disclosure.

FIG. 4 is a flow diagram 400 illustrating memory bandwidth optimization during flexible encryption, decryption, and authentication of data, in accordance with some implementations of the present disclosure. In conventional applications, recovering data that has been corrupted during storage, write, or read operations is typically performed using ECC bits that are stored together with the data. When the data is being retrieved from the memory, the ECC bits are read together with the data and the ECC bits are used to correct single-bit (or, sometimes, multi-bit) errors in the data. Conventionally, the data and the ECC bits are stored together, e.g., under the same memory address, while authentication tags are stored at a different memory location (e.g., under a different memory address). As a result, two memory accesses are typically used to retrieve data/ECC bits and the corresponding tags. Given that the data is corrupted infrequently, in most instances the retrieved ECC bits are not needed but still utilize the bandwidth of the memory access line (e.g., a bus). On the other hand, the authentication tags are needed every time to perform security checks.

To reduce the use of the memory access bandwidth, the storage of the authentication tags and ECC bits may be swapped. More specifically, as depicted in FIG. 4, AEA module 142 may generate encrypted data, ECC, and a tag (block 410), e.g. as described above in conjunction with FIG. 2A and FIG. 3. In some implementations, prior storing data/ECC/tag (block 430), AEA module 142 may check how much ECC memory is available and, if the amount of ECC memory is sufficient, store the tag in the ECC memory, e.g., under the same memory address with the data. If the amount of ECC memory is not sufficient, AEA module 142 may first truncate the tag (block 420), e.g., down to 64 (least or most significant) bits of the tag or any other number of bits. The number of bits to be stored may be a predetermined number obtained by balancing a probability of the truncated tags colliding against the ECC memory available for tag storage. For example, when full-sized tags have 128 bits, the viability of truncating tags down to 64 bits may be evaluated based on the probability that two tags (the stored tag and the control tag obtained based on compromised data) will have the same (e.g., lower) 64 bits but differ in any of the remaining bits.

Upon receiving a request to retrieve data (block 440), AEA module 142 or any other control logic responsible for data retrieval may retrieve the data together with the tag (block 450), e.g., using a single memory request directed to the common address of data/tag storage. After the data is read, a control tag is generated and authenticated (block 455), e.g., compared bit-by-bit with the retrieved stored tag (or with the corresponding truncated portion of the stored tag). If no mismatch is detected, AEA module 142 concludes that the data retrieval is complete (block 460). If a tag mismatch is detected, AEA module 142 does not initially presume that the data has been replaced or altered in an attack. Instead, AEA module 142 may retrieve ECC bits (block 470) and attempt to correct (repair) the data and/or the tag using the ECC bits (block 480). AEA module 142 may perform another authentication (block 485), e.g., a tag comparison. If the repair attempt is successful, e.g., the new tag generated using the corrected data matches and the correct data/tag are recovered, AEA module 142 concludes that no attack (or other security failure) has taken place and that a simple reliability failure occurred (block 460), taking no further action. If, on the other hand, the tag mismatch persists even after the ECC correction, AEA module 142 concludes that a security failure has occurred. The system can take an appropriate action to respond to the security threat as provided by security policies of the system (block 490). Such a response may involve refreshing data, refreshing keys and/or sending notifications to other parts of the system (e.g., host computer 102), including a processor 120 system controller (or other system controller) to reset the state of the processor 120 and/or system memory 130, or to perform any other suitable action.

As a result, since in most instances of read operations, the authentication tags are retrieved while ECC bits are not, the read traffic is reduced by the number of the ECC bits that would have otherwise been read unnecessarily. Instead, ECC bits are retrieved only in those instances where such bits are actually useful. In some implementations, no ECC bits are stored and the control of data authenticity/reliability is performed using stored (e.g., in the ECC memory) authentication tags. In such implementations, since the ECC recovery is not available, all authentication tag mismatches may be presumed to be security failures and the appropriate security breach protocol is followed in all such instances.

Figure 5:
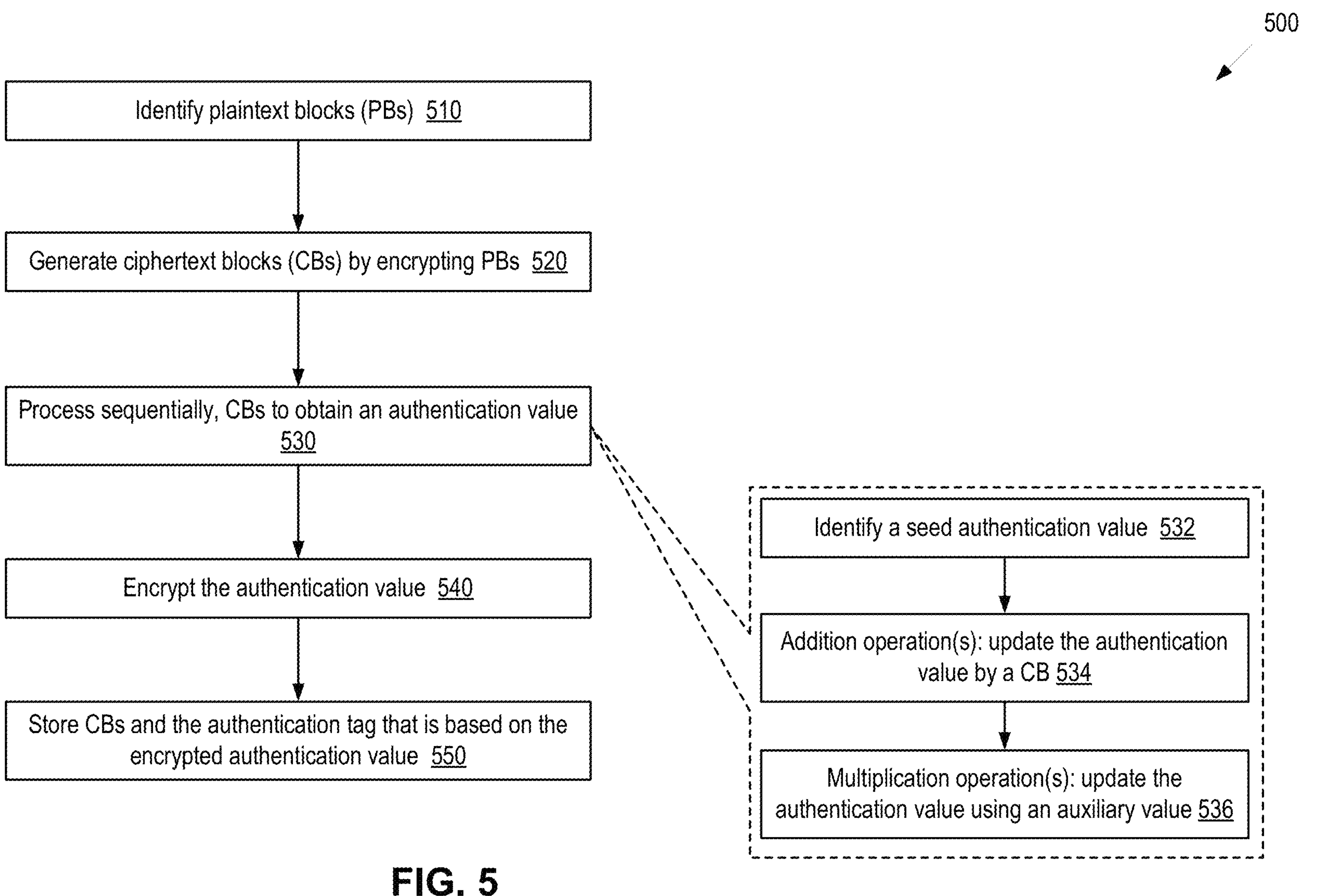
FIG. 5 is a flow diagram depicting a method of flexible encryption, decryption, and authentication of data, in accordance with one or more aspects of the present disclosure.
Figure 6:
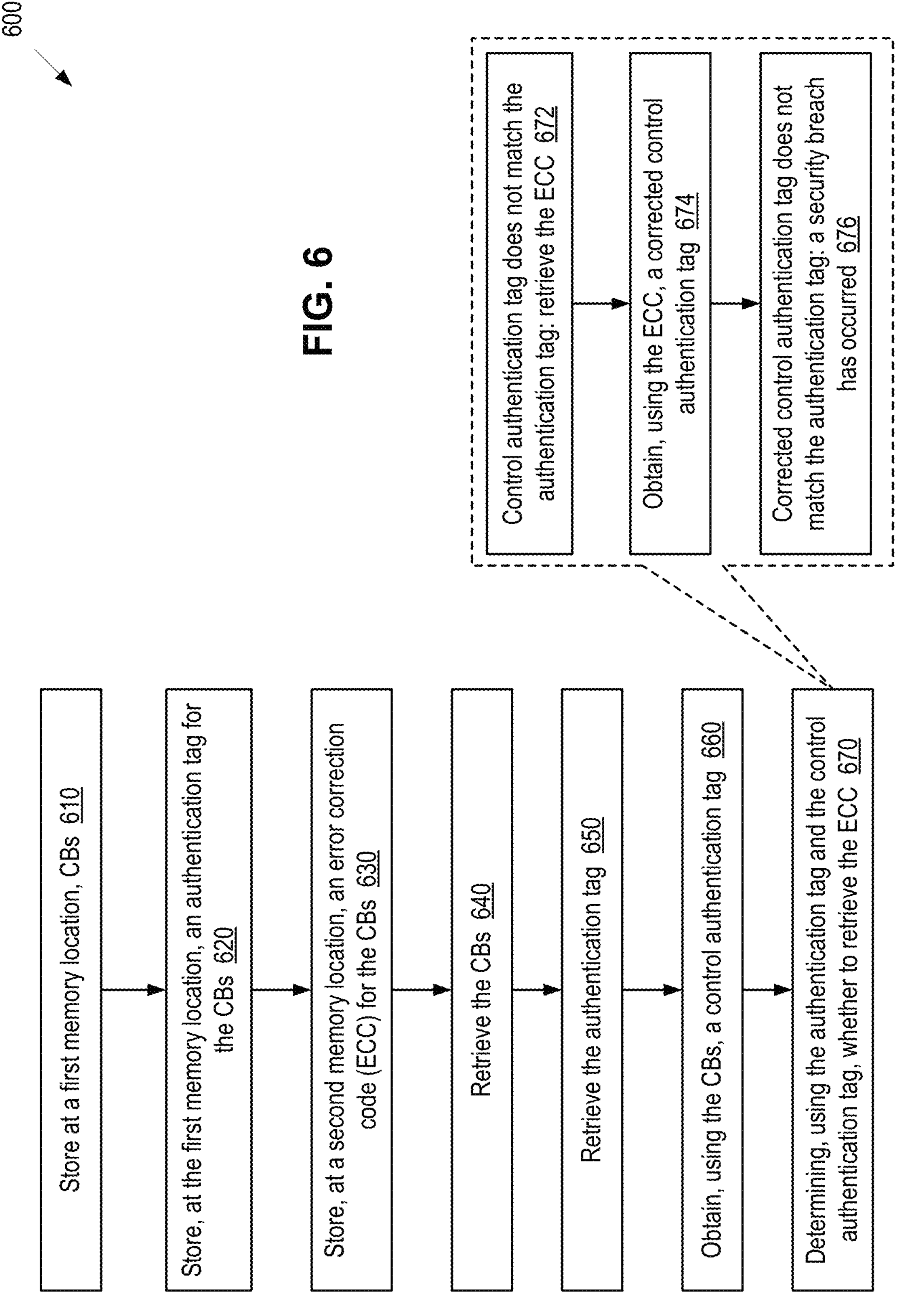
FIG. 6 is a flow diagram depicting a method of memory bandwidth optimization during flexible encryption, decryption, and authentication of data, in accordance with one or more aspects of the present disclosure.

FIGS. 5-6 are flow diagrams depicting illustrative methods 500-600 of flexible encryption, decryption, authentication of data, and detection of security breaches in accordance with one or more aspects of the present disclosure. Methods 500-600 and/or each of their individual functions, routines, subroutines, or operations may be performed by a cryptographic processor (accelerator), such as cryptographic engine 140 depicted in FIG. 1 or a general-purpose processor (such as processor 120 in FIG. 1) of host computer 102 or various cryptographic engines/processors of other devices (e.g., external memory device 160 in FIG. 1). Methods 500-600 may be performed using instructions output by AEA module 142 of host computer 102. The instructions may cause one or more cipher circuits (e.g., cipher circuits 204 and 250) and a plurality of processing circuits (e.g., addition circuits 240-*n* and multiplication circuits 242-*n*) perform various operations described below. Various blocks of methods 500-600 may be performed in a different order compared with the order shown in FIGS. 5-6. Some operations may be performed concurrently with other operations. Some operations may be optional. Methods 500-600 may be implemented as part of a cryptographic operation, e.g., an operation that utilizes symmetric key cryptography. In some implementations, methods 500-600 may be performed as part of execution of any other application, to ensure security of data communications between host computer 102 and external memory device 160. Encryption and/or decryption of data performed during execution of methods 500-600 may use any AES algorithm, SM4 algorithms, or any other suitable encryption/decryption algorithm. The encryption/decryption algorithms may include message authentication, e.g., AES-GCM authentication, Poly1305-Chacha20 (RFC 7905authentication, AES-Salsa20 authentication, or any other similar secure message authentication. In some implementations, at least some operations of methods 500-600 may be performed in parallel, each parallel thread executing one or more individual functions, routines, subroutines, or operations of the methods. In some implementations, parallel threads implementing methods 500-600 may be synchronized (e.g., using semaphores, critical sections, and/or other thread synchronization mechanisms). Alternatively, threads implementing methods 500-600 may be executed asynchronously with respect to each other. Various operations of methods 500-600 may be performed in a different order compared with the order shown in FIGS. 5-6. Some operations of methods 500-600 may be performed concurrently with other operations. In some implementations of methods 500-600, one or more operations shown in FIGS. 5-6 are not performed.

FIG. 5 is a flow diagram depicting method 500 of flexible encryption, decryption, and authentication of data, in accordance with one or more aspects of the present disclosure. In some implementations, the cryptographic operation is an encryption operation or a decryption operation, e.g., an encryption/decryption operation that involves addition (e.g., bitwise XOR addition) of a block of data to a cryptographic key. At block 510, a processing device, e.g., a processor, cryptographic engine or accelerator, etc., that perform method 500 may identify a plurality of plaintext blocks. The plaintext blocks may be computed by the processing device of a computing device that performs method 500, by a different processing device of the same computing device, by a processing device of a different computing device, and so one. The plaintext blocks may be stored locally, received over a local or network connection, and the like. The plaintext blocks may have a 128-bit size, 256-bit size, or any other bit size. The plurality of plaintext blocks may be a part of the same data parcel that is authenticated using the same authentication tag (message authentication message or MAC). At block 520, the processing device performing method 500 may generate a plurality of ciphertext blocks. Each of the plurality of ciphertext blocks may be generated by encrypting a respective block of the plurality of plaintext blocks. For example, each plaintext block may be added (e.g., using XOR addition) to a cryptographic key. The plurality of ciphertext blocks may be generated using a single cipher circuit (e.g., sequentially and/or in a pipeline fashion) or multiple cipher circuits (e.g., using parallel processing). The one or more cipher circuits may implement at least one of AES encryption or SM4 encryption.

In some implementations, generating the plurality of ciphertext blocks may include processing the plurality of plaintext blocks in view of an additional input. The additional input may include a cryptographic key (e.g., key 208 in FIG. 1) and any suitable metadata (e.g., parcel metadata 210). In some implementations, the metadata may include a memory address of a memory location (e.g., memory address 222) allocated to storing the plurality of ciphertext blocks. In some implementations, the metadata may include a version number (e.g., version number 224) associated with the plurality of plaintext blocks. In some implementations, the metadata may include any session-specific information, such as a user-defined information, application-defined information, virtual machine-defined information (e.g., virtual machine identification metadata), metadata), any physical system identifier, and the like.

At block 530, method 500 may continue processing sequentially the plurality of ciphertext blocks to obtain an authentication value. As illustrated with the callout portion in FIG. 5, sequential processing of the plurality of ciphertext blocks may include, at block 532, initiating the authentication value with a seed authentication value (e.g., AD 220). The seed authentication value may include at least one of a version number (e.g., version number 224) associated with the plurality of plaintext blocks or a memory address (e.g., memory address 222) of a memory location allocated to storing the plurality of ciphertext blocks. Method 500 may further include using a plurality of addition operations and a plurality of multiplication operations to obtain the authentication value starting from a seed authentication value. For example, addition operations may include operations performed by addition circuits 240-1 . . . 240-5 and multiplication operations may include operations performed by multiplication circuits 242-1 . . . 242-5. At least a subplurality (e.g., operations of addition circuits 240-1 . . . 240-4) of the plurality of addition operations may update the authentication value by adding, to the authentication value, a respective ciphertext block of the plurality of ciphertext blocks (block 534). For example, each of the values $T_0$ . . . $T_{N-1}$ may be added to a respective ciphertext block 206-*n*. The plurality of multiplication operations may update the authentication value by multiplying the authentication value by an auxiliary value. For example, each of the multiplication circuits 242-1 . . . 242-5 may multiply the authentication value by a hash key H. "Authentication value" should be understood as a value that may be changed multiple times during computation of the authentication tag. For example, "authentication value" may refer to outputs of any of the addition circuits 240-*n* and any of the multiplication circuits 242-*n*.

At block 540, method 500 may continue with encrypting the authentication value to obtain an encrypted authentication value. In some implementations, the encrypted authentication value may be obtained by processing the authentication value using a cipher circuit. For example, the encrypted authentication value may be (or include) an output of cipher circuit 250 that processes authentication value $T_{N+1}$. At block 550, method 500 may continue with storing the plurality of ciphertext blocks and an authentication tag for the plurality of ciphertext blocks. In some implementations, the authentication tag (e.g., authentication tag 260) may be based on the encrypted authentication value. In some implementations, the encrypted authentication value may be used as the authentication tag directly. In some implementations, the authentication tag may include the encrypted authentication value and any additional data (or metadata). In some implementations, the authentication tag may be obtained using the encrypted authentication value and some other data, e.g., a tweak value. For example, as described in conjunction with FIG. 3, tag 330 may be obtained by adding tweak value $tweak_N$ to the output of cipher circuit 324. In some implementations, the tweak value may be obtained by using an encrypted, by a cipher circuit, authentication data, e.g., $tweak_N$ may be obtained using AD 302. In some implementations, the authentication data may include a memory address of a memory location allocated to storing the plurality of ciphertext blocks and/or the version number of the plurality of plaintext (or ciphertext) blocks.

Operations of blocks 510-550 of method 500 may be performed as part of the first selectable mode of the cryptographic processor. In the second selectable mode, the cryptographic processor may perform operations of blocks 510-520 and forgo operations of blocks 530-550.

FIG. 6 is a flow diagram depicting method 600 of memory bandwidth optimization during flexible encryption, decryption, and authentication of data, in accordance with one or more aspects of the present disclosure. In some implementations, method 600 may be used in conjunction with method 500 or at least a portion of method 500, e.g., blocks 510-530. For example, method 600 may be used after ciphertext blocks, an authentication tag, and ECC bits for the ciphertext blocks (and, optionally for the authentication tag) have been generated. At block 610, method 600 may include storing, at a first memory location, a plurality of ciphertext blocks. A memory location should be understood as including a specific memory device having one or more partitions, a specific partition (having multiple memory addresses) of a memory device, or a specific address of a memory partition. A memory location should be understood as including any number (e.g., one or more) of physical memory addresses or logical memory addresses.

At block 620, method 600 may include storing, at the first memory location, an authentication tag for the plurality of ciphertext blocks. In some implementations, the authentication tag and the plurality of ciphertext blocks may be stored at the same address of the first location or at a plurality of contiguous addresses of the first location. In some implementations, the authentication tag and the plurality of ciphertext blocks may be stored at a plurality of non-contiguous addresses of the first location. At block 630, method 600 may continue with the processing device storing, at a second memory location, an error correction code (ECC) for the plurality of ciphertext blocks. In some implementations, ECC may be stored in conjunction with each block separately (e.g., a separate ECC for each block) or in conjunction with all blocks collectively.

At block 640, method 600 may continue with the processing device retrieving, from the first memory location, the plurality of ciphertext blocks. The retrieval may be responsive to any request obtained (or generated) by the processing device performing method 600. At block 650, the processing device may also retrieve, from the first memory location, the authentication tag. At block 660, the processing device may decrypt the retrieved ciphertext blocks and obtain, using the plurality ciphertext blocks (encrypted ciphertext blocks or decrypted plaintext blocks), a control authentication tag for the plurality of ciphertext blocks. At block 670, method 600 may continue with the processing device determining, responsive to a comparison of the authentication tag to the control authentication tag, whether to retrieve the ECC.

In some instances, the processing device may determine that the control authentication tag matches the authentication tag. Responsive to this determination, the processing device may forgo retrieval of the ECC and conclude that no security breach has occurred. In some implementations, as depicted with the callout portion in FIG. 6, the processing device may determine that the control authentication tag does not match the authentication tag. Responsive to this determination, the processing device may, at block 672, retrieve the ECC from the second memory location. The processing device may then determine, based on the application of the retrieved EDD, whether a security breach has occurred. More specifically, determining whether a security breach has occurred may include, at block 674, obtaining, using the retrieved ECC, a corrected control authentication tag. For example, the processing device may use the ECC to correct for bit errors in the ciphertext blocks and then generate a corrected control authentication tag. At block 676, the processing device may determine that the corrected control authentication tag still does not match the authentication tag, and responsive to such a determination, conclude that a security breach has occurred. In such instances, the processing device may follow any applicable protocol to address the security breach. In those instances where the processing device determines that the corrected control authentication tag matches the authentication tag, the processing device may conclude that no security breach has occurred and, therefore, may take no further action regarding a possible security breach).

Figure 7:
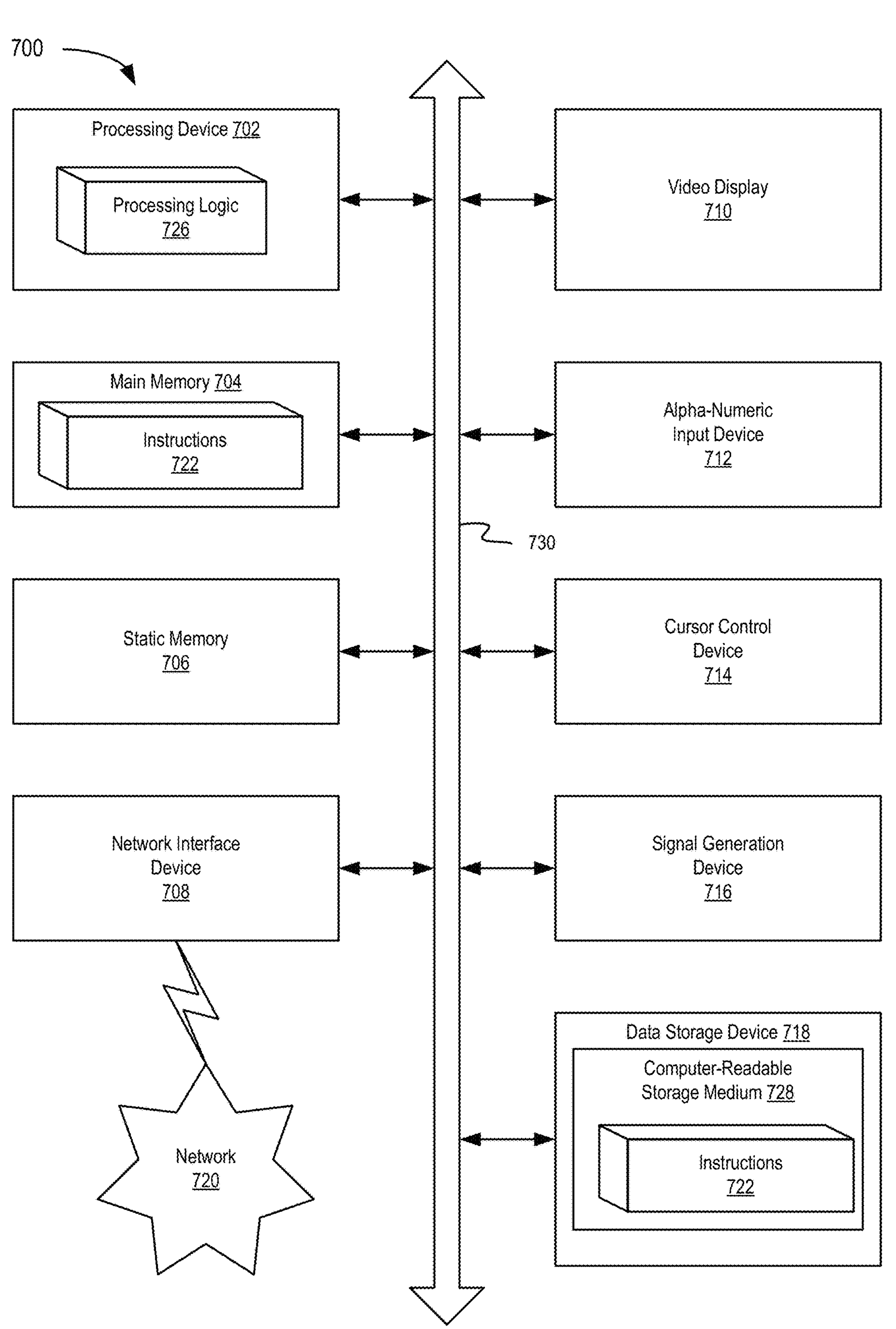
FIG. 7 is a block diagram of an example computer system operating in accordance with one or more aspects of the present disclosure.

FIG. 7 depicts a block diagram of an example computer system 700 operating in accordance with one or more aspects of the present disclosure. In various illustrative examples, example computer system 700 may be host computer 102, illustrated in FIG. 1. Example computer system 700 may be connected to other computer systems in a LAN, an intranet, an extranet, and/or the Internet. Computer system 700 may operate in the capacity of a server in a client-server network environment. Computer system 700 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 700 may include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 may be configured to execute instructions implementing method 500 of flexible encryption, decryption, and authentication of data and method 600 of memory bandwidth optimization during flexible encryption, decryption, and authentication of data.

Example computer system 700 may further comprise a network interface device 708, which may be communicatively coupled to a network 720. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions implementing method 500 of flexible encryption, decryption, and authentication of data and method 600 of memory bandwidth optimization during flexible encryption, decryption, and authentication of data.

Executable instructions 722 may also reside, completely or at least partially, within main memory 704 and/or within processing device 702 during execution thereof by example computer system 700, main memory 704 and processing device 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to store a parcel of data in a memory device at a memory address jointly associated with the parcel of data and an error correction (EC) space for the parcel of data, the method comprising:

- encrypting, by a processing device, a plurality of plaintext blocks of the parcel of data to generate a plurality of ciphertext blocks, wherein each of the plurality of ciphertext blocks is generated by encrypting a respective block of the plurality of plaintext blocks;
- processing sequentially, by the processing device, the plurality of ciphertext blocks to obtain an authentication value;
- encrypting, by the processing device, the authentication value to obtain an encrypted authentication value; and
- storing, in the memory device, the plurality of ciphertext blocks and a target number of bits of an authentication tag for the plurality of ciphertext blocks, wherein the authentication tag is based on the encrypted authentication value, and wherein the target number of bits is determined by a size of the EC space for the parcel of data.

2. The method of claim 1, wherein the plurality of ciphertext blocks are generated using one or more cipher circuits, wherein the one or more cipher circuits implement at least one of AES encryption or SM4 encryption.

3. The method of claim 1, wherein generating the plurality of ciphertext blocks comprises processing the plurality of plaintext blocks in view of an additional input, wherein the additional input comprises a cryptographic key and at least one of a version number associated with the plurality of plaintext blocks, the memory address, or a session-specific information.

4. The method of claim 3, wherein processing sequentially the plurality of ciphertext blocks to obtain the authentication value comprises:

- using a plurality of addition operations and a plurality of multiplication operations, to obtain the authentication value starting from a seed authentication value, wherein at least a sub-plurality of the plurality of addition operations updates the authentication value by adding, to the authentication value, a respective ciphertext block of the plurality of ciphertext blocks, and wherein the plurality of multiplication operations updates the authentication value by multiplying the authentication value by an auxiliary value.

5. The method of claim 4, wherein the seed authentication value comprises at least one of a version number associated with the plurality of plaintext blocks or a memory address of a memory location allocated to storing the plurality of ciphertext blocks.

6. The method of claim 1, wherein the authentication tag comprises the encrypted authentication value.

7. The method of claim 1, wherein the encrypted authentication value is obtained by processing the authentication value using a cipher circuit.

8. The method of claim 1, wherein the authentication tag is obtained using the encrypted authentication value and a tweak value, wherein the tweak value is obtained by using an encrypted, by a cipher circuit, authentication data, wherein the authentication data comprises the memory address.

9. A system comprising:

- a processing device; and
- a memory device communicatively coupled to the processing device, wherein the processing device is configured to:
  - encrypt a plurality of plaintext blocks of a parcel of data to generate a plurality of ciphertext blocks, wherein each of the plurality of ciphertext blocks is generated by encrypting a respective block of the plurality of plaintext blocks;
  - process sequentially the plurality of ciphertext blocks to obtain an authentication value;
  - encrypt the authentication value to obtain an encrypted authentication value; and
  - store, in the memory device at a memory address jointly associated with the parcel of data and an error correction (EC) space for the parcel of data, the plurality of ciphertext blocks and a target number of bits of an authentication tag for the plurality of ciphertext blocks, wherein the authentication tag is based on the encrypted authentication value, and wherein the target number of bits is determined by a size of the EC space for the parcel of data.

10. The system of claim 9, wherein the plurality of ciphertext blocks are generated using one or more cipher circuits, wherein the one or more cipher circuits implement at least one of AES encryption or SM4 encryption.

11. The system of claim 9, wherein to generate the plurality of ciphertext blocks the processing device is configured to process the plurality of plaintext blocks in view of an additional input, wherein the additional input comprises a cryptographic key and at least one of a version number associated with the plurality of plaintext blocks or the memory address.

12. The system of claim 11, wherein to process sequentially the plurality of ciphertext blocks to obtain the authentication value, the processing device is configured to:

- use a plurality of addition operations and a plurality of multiplication operations, to obtain the authentication value starting from a seed authentication value, wherein at least a sub-plurality of the plurality of addition operations updates the authentication value by adding, to the authentication value, a respective ciphertext block of the plurality of ciphertext blocks, and wherein the plurality of multiplication operations updates the authentication value by multiplying the authentication value by an auxiliary value.

13. The system of claim 12, wherein the seed authentication value comprises at least one of a version number associated with the plurality of plaintext blocks or a memory address of a memory location allocated to storing the plurality of ciphertext blocks.

14. The system of claim 9, wherein the authentication tag comprises the encrypted authentication value.

15. The system of claim 9, wherein the encrypted authentication value is obtained by processing the authentication value using a cipher circuit.

16. The system of claim 9, wherein the authentication tag is obtained using the encrypted authentication value and a tweak value, wherein the tweak value is obtained by using an encrypted, by a cipher circuit, authentication data, wherein the authentication data comprises the memory address.

17. A non-transitory computer-readable memory comprising instructions that, when executed by a processing device, cause the processing device to:

encrypt a plurality of plaintext blocks of a parcel of data to generate a plurality of ciphertext blocks, wherein each of the plurality of ciphertext blocks is generated by encrypting a respective block of the plurality of plaintext blocks;

process sequentially the plurality of ciphertext blocks to obtain an authentication value;

encrypt the authentication value to obtain an encrypted authentication value; and store, in a memory device at a memory address jointly associated with the parcel of data and an error correction (EC) space for the parcel of data, the plurality of ciphertext blocks and a target number of bits of an authentication tag for the plurality of ciphertext blocks, wherein the authentication tag is based on the encrypted authentication value, and wherein the target number of bits is determined by a size of the EC space for the parcel of data.

18. The non-transitory computer-readable memory of claim 17, wherein the authentication tag comprises the encrypted authentication value.

19. The non-transitory computer-readable memory of claim 17, wherein the encrypted authentication value is obtained by processing the authentication value using a cipher circuit.

20. The non-transitory computer-readable memory of claim 17, wherein the authentication tag is obtained using the encrypted authentication value and a tweak value, wherein the tweak value is obtained by using an encrypted, by a cipher circuit, authentication data, wherein the authentication data comprises the memory address.

* * * * *